United States Patent [19]

Sellers

[11] Patent Number: 5,625,532
[45] Date of Patent: Apr. 29, 1997

[54] REDUCED HEIGHT KEYBOARD STRUCTURE FOR A NOTEBOOK COMPUTER

[75] Inventor: Charles A. Sellers, Houston, Tex.

[73] Assignee: Compaq Computer Corporation, Houston, Tex.

[21] Appl. No.: 541,460

[22] Filed: Oct. 10, 1995

[51] Int. Cl.$^6$ .............. G06F 1/16; H01H 3/12; B41J 11/56; H05K 7/04
[52] U.S. Cl. .............. 361/680; 200/344; 400/490; 400/682
[58] Field of Search .............. 364/708.1; 345/168, 345/169; 400/472, 479, 488–492, 682, 691–693; 200/5 A, 342, 344, 345; 361/680, 683

[56] References Cited

U.S. PATENT DOCUMENTS

| | | | |
|---|---|---|---|
| 5,329,084 | 7/1994 | Watanabe et al. | 200/344 |
| 5,399,822 | 3/1995 | Sato et al. | 200/345 X |
| 5,424,516 | 6/1995 | Emmons | 200/344 |
| 5,466,901 | 11/1995 | Mochizuki | 200/345 X |
| 5,512,719 | 4/1996 | Okada et al. | 200/345 X |

*Primary Examiner*—Michael W. Phillips
*Attorney, Agent, or Firm*—Konnecker & Smith

[57] ABSTRACT

A notebook computer is provided with a reduced height keyboard structure mounted on the top side of its base housing and including a horizontally oriented signal pad structure. Spaced apart separate key support and guide structures are individually supported on the top side of the signal pad structure beneath upwardly dished keys mounted thereon by scissored linkage mechanisms which permit the keys to be vertically moved through a stroke distance between upwardly extended and downwardly retracted positions. The keys are upwardly biased toward their extended positions by resilient key return dome members secured to the top side of the signal pad structure and extending upwardly through openings in the key support and guide structures. The keys and their associated key support and guide structures are relatively configured in a manner such that when a given key is downwardly moved to its retracted position its associated key support and guide structure is received in the upwardly dished interior of the key so that the bottom side edge periphery of the key is moved downwardly past the horizontal side edge periphery of the key support and guide structure and into close adjacency with the top side of the signal pad structure. This telescoping of the key support and guide structure and its associated key permits the vertical thickness of the keyboard to be reduced without reducing the key stroke distance.

18 Claims, 3 Drawing Sheets

REDUCED HEIGHT KEYBOARD STRUCTURE FOR A NOTEBOOK COMPUTER

BACKGROUND OF THE INVENTION

1. Field of the Invention

The present invention relates generally to computer apparatus, and more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

As can be readily seen from the foregoing, it would be desirable to provide an improved notebook computer keyboard structure which permits a useful thickness reduction in the closed computer without a corresponding reduction in the operative keystroke distance of the keyboard structure. It is accordingly an object of the present invention to provide such an improved notebook computer keyboard structure.

SUMMARY OF THE INVENTION

In carrying out principles of the present invention, in accordance with a preferred embodiment thereof, a portable computer, representatively a notebook computer, is provided with a specially designed keyboard structure. The vertical thickness of the overall keyboard structure is advantageously reduced without the previous necessity of reducing its keystroke to achieve such thickness reduction. The computer includes a base housing portion having a top side, and a lid housing portion secured to the base housing portion for pivotal movement relative thereto between a closed position in which the lid housing portion extends across and covers the top side, and an open position in which the lid housing portion uncovers and exposes the top side of the base housing portion.

In a preferred embodiment thereof, the reduced height keyboard structure of the present invention includes a key pad structure having top and bottom sides, and a series of key cap members positioned above the key pad structure and mutually spaced apart from one another in a direction parallel to the top side of the key pad structure. Each of the key cap members has a bottom side edge periphery facing the top side of the key pad structure, and an upwardly dished interior portion bounded by the bottom side edge periphery.

A spaced apart series of key support and guide members are supported on the top side of the key pad structure in an aligned, underlying relationship with the key cap members. Each of the key support and guide members has a top side and further has a side edge periphery spaced inwardly of the bottom side edge periphery of its associated key cap member in a direction parallel to the top side of the key pad structure.

Linking means are provided for securing each of the key cap members to its underlying key support and guide member for movement relative thereto, through a key stroke distance, between an upwardly extended position in which the key cap member is spaced upwardly apart from the top side of the key pad structure, and a downwardly retracted position in which the underlying key support and guide member is upwardly received in the interior of the key cap member with the bottom side edge periphery of the key cap member being adjacent the top side of the key pad structure. Biasing means are additionally provided for resiliently biasing each of the key cap members toward its upwardly extended position.

Representatively, the linking means include a series of scissored linkage assemblies operatively interconnecting the vertically opposing pairs of key cap members and key support and guide members, and the biasing means include a spaced series of elastomeric key return dome members secured to the top side of the key pad structure, extending upwardly through central openings in the key support and guide members, and bearing upwardly against the scissored linkage assemblies.

The key support and guide members are representatively anchored to the top side of the key pad structure by means of depending leg portions of the key support and guide members that extend downwardly through holes in the key pad structure and are locked to flange structures formed in the bottom layer of the signal pad structure.

The use of the spaced series of key support and guide members that each extend upwardly into the dished interior of its associated key cap member when the key cap member is manually depressed permits the key cap members to positioned closer to the top side of the key pad structure, thereby reducing the overall vertical thickness of the keyboard apparatus without reducing the stroke distance of its keys.

DETAILED DESCRIPTION

Figure 1:
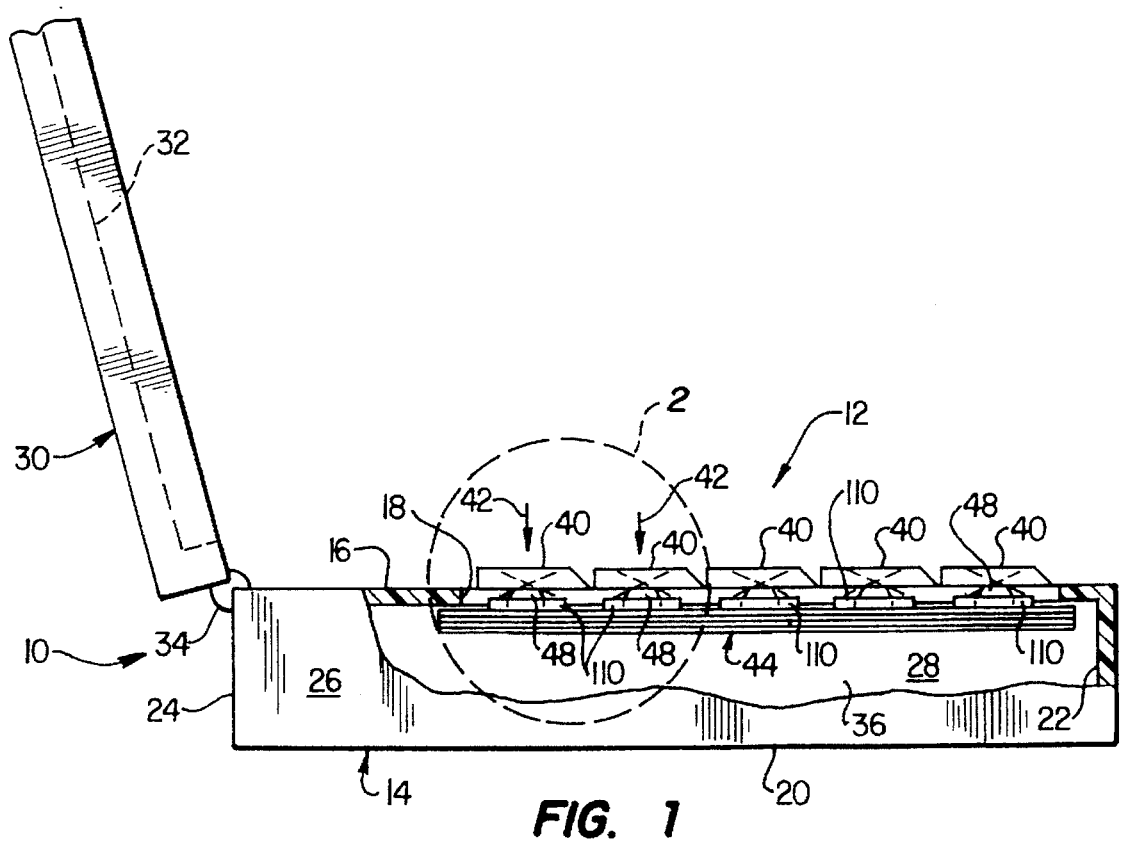
FIG. 1 is a partially sectioned, simplified side elevational view of a notebook computer having a reduced height keyboard structure embodying principles of the present invention, the computer being in an opened orientation.

Referring initially to FIG. 1, the present invention provides a portable computer, illustratively a notebook computer 10, having incorporated therein a specially designed reduced height keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 334 to a top rear corner portion of the base housing 14. Lid housing 30 may be upwardly pivoted to place the computer 10 in an open use orientation (FIG. 1) in which the top side 16 of the base housing 14 and the top side of the keyboard structure 12 are exposed and the display screen 32 forwardly faces the user of the computer, or downwardly pivoted to place the computer 10 in a closed storage and transport orientation (not shown) in which the lid housing extends across and covers the top side of the base housing 14 and the top side of the keyboard structure 12.

The reduced height keyboard structure 12 extends across the opening 18 in the top side wall 16 of the base housing 14 and occupies only a relatively small upper portion of the interior 36 of the base housing 14. Referring now to FIGS. 1–3 and 6, the keyboard structure 12 basically comprises a series of manually depressible key cap members 40 disposed generally in the top side wall opening 18 and vertically movable relative to the base housing 14, as indicated by the arrows 42 in FIG. 1, through a keystroke distance D (see FIG. 2); and a horizontally oriented multilayer key pad structure 44 that is suitable anchored within the base housing 14 in a downwardly spaced relationship with the key cap members 40.

Figure 3:
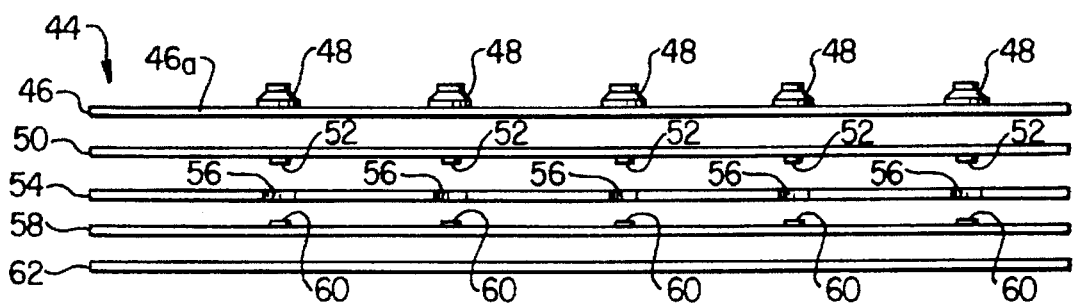
FIG. 3 is a highly schematic exploded side elevational view of a multilayered signal pad portion of the keyboard structure.

The multilayer signal pad structure 44 is transverse to the key stroke directions 42, is of a generally conventional construction, and is shown in simplified exploded form in FIG. 3. Signal pad structure 44 includes, from top to bottom, (1) a plastic dome sheet 46 having a spaced series of rubber key return domes 48 projecting upwardly from its top side 46a; (2) a plastic top circuit sheet 50 having a spaced series of circular, electrically conductive pads 52 disposed on its bottom side, aligned with the domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62. The five sheet members 46, 50, 54, 58, 62 are suitably held in their indicated stacked orientation to combinatively define the overall signal pad structure 44.

Figure 4:
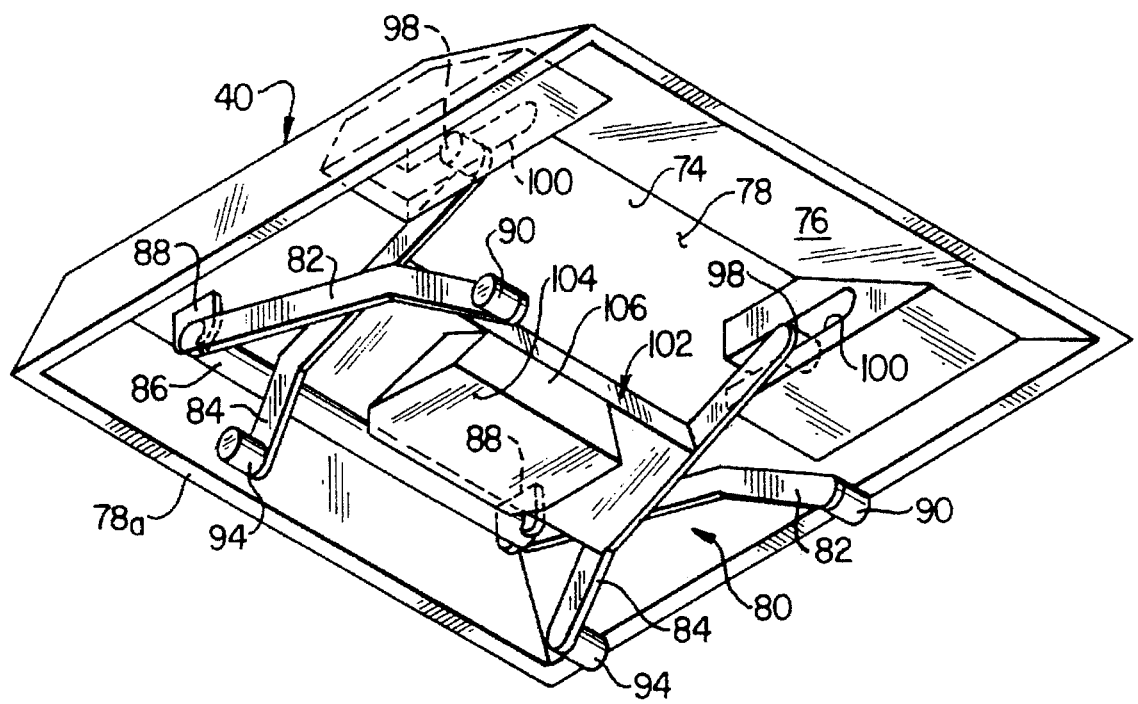
FIGS. 4 and 5 are enlarged scale bottom side perspective views of a key cap member respectively illustrating a scissored support portion thereof in its extended and retracted positions.
Figure 5:
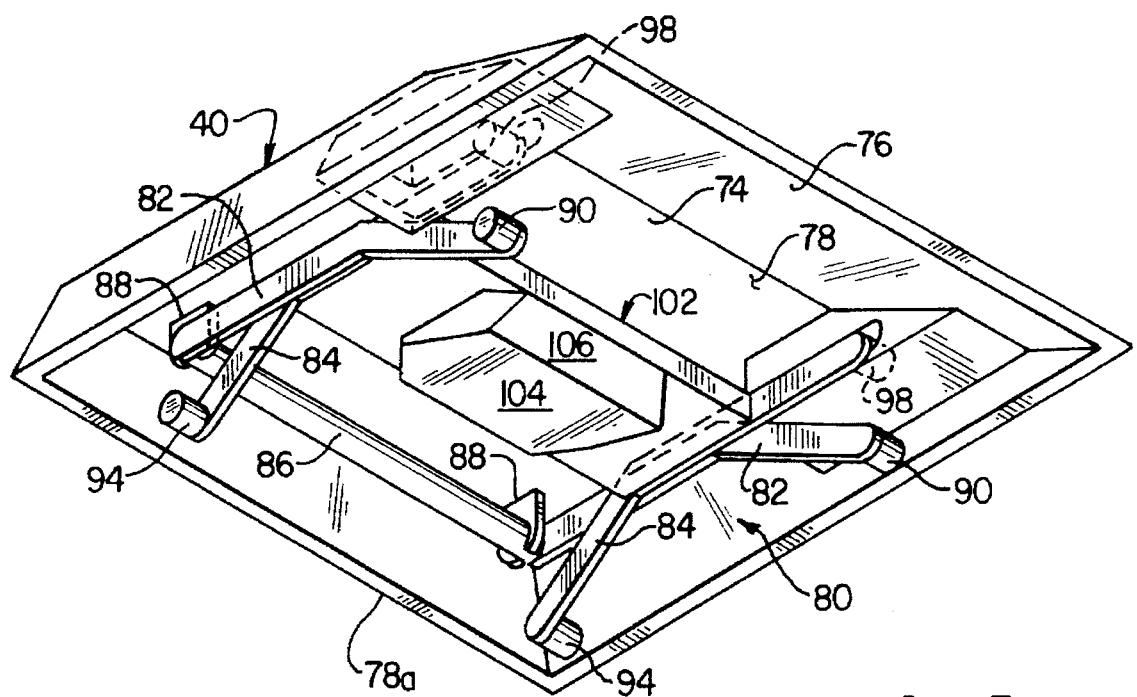

Turning now to FIGS. 4 and 5, each of the key cap members 40 has a hollow, rectangular, upwardly dished molded plastic body with a top side wall 74 with a downwardly and forwardly sloping front edge portion 76, and an open bottom side 78 bounded by a rectangular, downwardly facing side wall edge periphery 78a of the key cap member. A scissored linkage assembly 80 is secured to the bottom of each of the key cap members 40 and includes a first pair of scissor arms 82 and a second pair of scissor arms 84, with longitudinally intermediate portions of the arms 82 being pivotally connected to longitudinally intermediate portions of the arms 84 as indicated.

First ends of the arms 82 are joined by a cylindrical rod 86 pivotally anchored in tabs 88 projecting downwardly from the top key cap member wall 74, while the opposite ends of the arms 82 have outwardly projecting cylindrical pins 90 formed thereon. First ends of the arms 84 have outwardly projecting cylindrical pins 94, while the opposite ends of the arms 84 have outwardly projecting cylindrical pins 98 slidingly received in slots 100 formed on the underside of the key cap member 40.

Longitudinally intermediate portions of the scissor arms 84 are interconnected by a joining plate structure 102 having, on its underside, a bottom surface 104, and a forwardly facing surface 106 extending at an angle to the surface 104. Each scissored linkage assembly 80 is movable relative to its associated key cap member 40 between an upwardly extended position shown in FIG. 4, and a downwardly retracted position shown in FIG. 5.

In a manner subsequently described in detail herein, lower side portions of the scissored linkage assemblies 80 are anchored to the top side of the multilayer signal pad structure 44 in a manner placing the key cap members 40 above and in horizontal alignment with the resilient key return domes 48. With the key cap members 40 in their upwardly extended positions, their associated scissored linkage assemblies 80 are similarly in their upwardly extended positions shown in FIG. 4, with the surfaces 104 of the linkages assemblies 80 overlying and downwardly engaging the upper ends of the resilient key return domes 48.

When any of the key cap members 40 is manually depressed (i.e., from its position on the left in FIG. 2 to its position on the right in FIG. 2), against the resilient resistance of its associated return dome 48, the dome is downwardly deformed to cause an internal projection 108 therein to be downwardly pressed against a portion of the dome sheet 46 underlying the projection 108. This, in turn, causes the contact pad pair 52,60 underlying the projection 108 to be brought into engagement with one another and cause their associated circuitry to output an electrical signal indicative of the striking of their associated key cap member. When the key cap member is released from its manually depressed orientation, it is automatically returned upwardly to its upwardly extended position (shown on the left in FIG. 2) by the resilient force of its underlying key return dome 48 which functions as a return spring means.

While the key cap members 40 have been representatively illustrated as being supported on the top side of the signal pad structure using scissored linkage assemblies, other means of supporting the key cap members 40 for vertical movement could be utilized if desired. Moreover, spring return means other than the rubber key return domes 48 could be utilized if desired.

Figure 2:
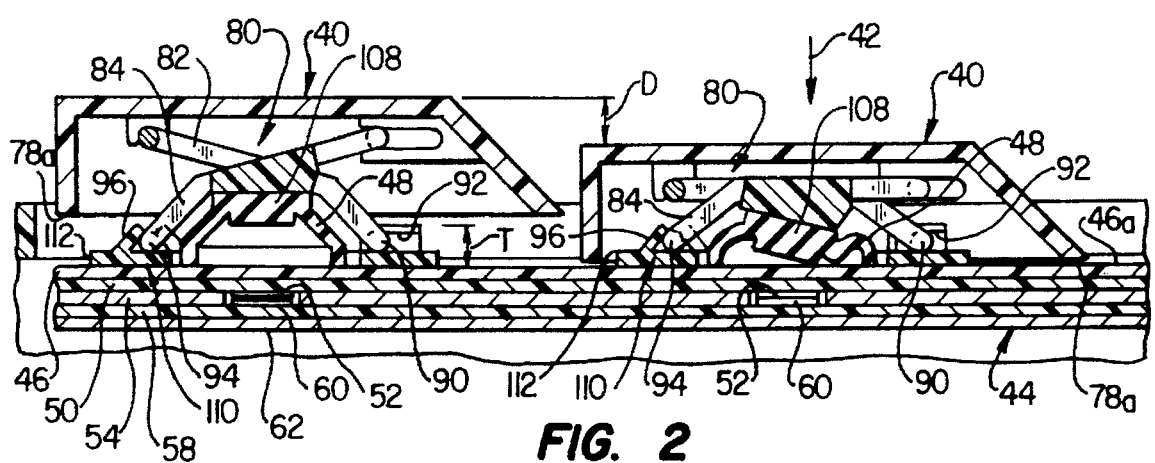
FIG. 2 is an enlarged scale cross-sectional detail view of the circled keyboard area "2" in FIG. 1 and illustrates one key in its upwardly extended position, and another key in its downwardly depressed position.
Figure 6:
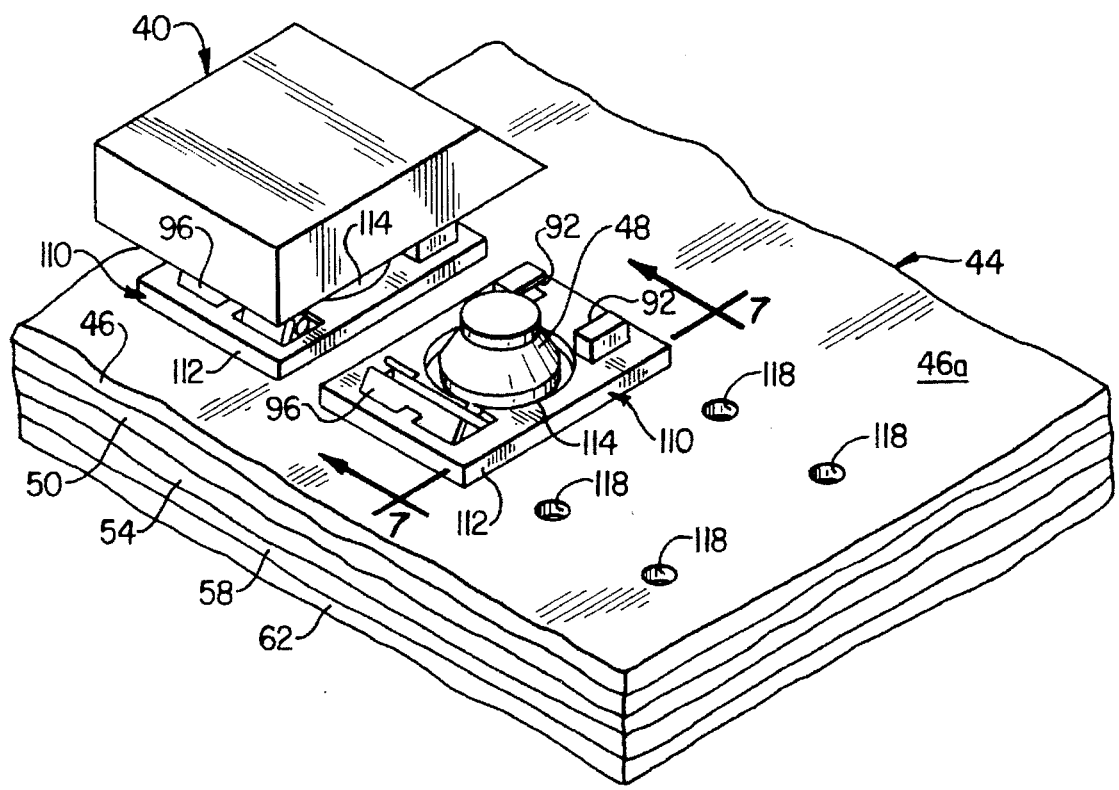
FIG. 6 is an enlarged scale simplified top side perspective view of a portion of the signal pad illustrating a representative pair of specially designed key support guide structures secured thereto and embodying principles of the present invention.
Figure 7:
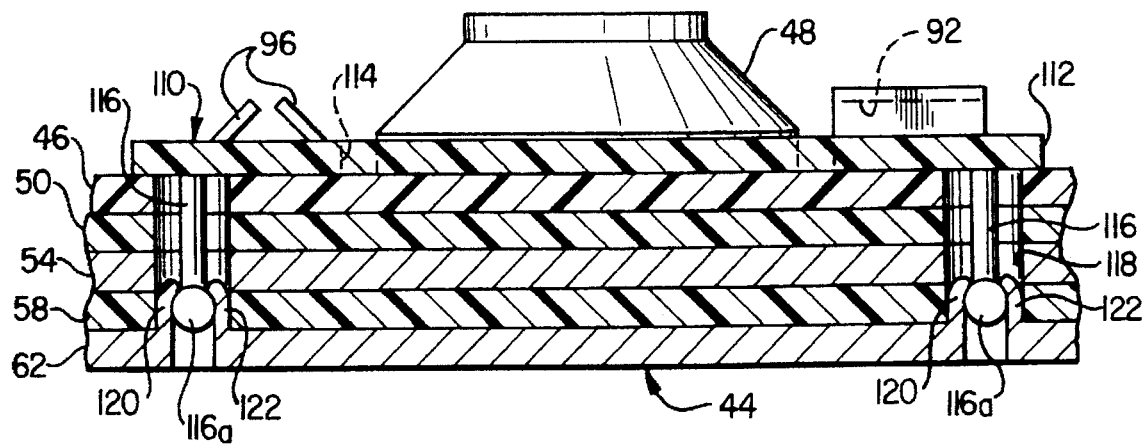
FIG. 7 is an enlarged scale cross-sectional view taken through a portion of the signal pad along line 7—7 of FIG. 6.

With reference now to FIGS. 2, 6 and 7, to advantageously reduce the overall height of the keyboard structure 12, the bottom sides of the scissored linkages 80 are operatively secured to a horizontally spaced series of specially designed separate key support and guide structures 110 which are separately anchored in a horizontally spaced array on the top side 46a of the multilayer signal pad structure 44 in underlying alignment with the key caps 40.

Each of the key support and guide structures 110 has a rectangular body portion with a horizontal side edge periphery 112, and a central circular opening 114 through which one of the key return domes 48 upwardly projects. The bottom sides of the scissored linkages 80 are operatively secured to their associated key support and guide structures 110 by means of slots 92 formed on the top sides of the structures 110 and pivotally receiving the linkage pins 90, and tabs 96 formed on the top sides of the structures 110 and slidingly receiving the linkage pins 94.

The horizontally spaced series of key support and guide structures 110, which are preferably plastic moldings, are individually anchored to the top side 46a of the dome sheet 46 by means of depending legs 116 formed on the corners of each of the structures 110 and extending downwardly through circular holes 118 that transversely pass through the signal pad structure 44 from the top side 46a of the dome sheet 46 to the top side of the metal backing sheet 62. Lower end portions 116a of the legs 116 (see FIG. 7) are transversely enlarged and snap into upwardly projecting tab pairs 120,122 on the metal backing sheet 62 to anchor the key support and guide structures 110 in place on the top side of the signal pad structure 44.

Turning now to FIG. 2, according to an important feature of the present invention the horizontal side edge periphery 112 of each of the key support and guide structures 110 is spaced horizontally inwardly of the lower side edge periphery 78a of its associated key cap member 40. Additionally, each key support and guide structure 110 is sized to be upwardly received within the upwardly dished interior of its associated key cap member 40 when the key cap member 40 is downwardly moved from its extended position (shown on the left in FIG. 2) through its key stroke distance D to its retracted position (shown on the right in FIG. 2).

This configurational relationship between each key support and guide structure 110 and its associated key cap member 40 permits the lower side edge periphery 78a to be moved downwardly past the top side of the structure 110 into close adjacency with the top side 46a of the dome sheet 46 when the key cap member 40 is downwardly moved through its key stroke distance D. In a conventionally constructed portable computer keyboard assembly, the key support and guide structures 110 would typically be integral portions of a plastic sheet structure positioned atop the dome sheet 46 and commonly referred to as a monoblock structure having generally the same vertical thickness T (normally in the 1–2 millimeter range) as the illustrated individual key support and guide structures 110.

As can be readily seen, using this conventional construction the overall height of the keyboard assembly 12 would be substantially equal to the sum of the vertical thickness of the signal pad structure 44, the vertical thickness T, and the key stroke distance D. However, due to the ability in the present invention to move the bottom side edge peripheries 78a of the key caps 40 downwardly past the top sides of the key support and guide structures 110, and into close adjacency with the top side 46a of the dome sheet 46, the top sides of the key cap members 40 may be vertically positioned a distance T closer to the top side 46a of the dome sheet 46, thereby advantageously reducing the overall vertical thickness of the keyboard assembly 12 by the same distance T while maintaining the same keystroke distance D.

This height savings of one or more millimeters across the entire horizontal extent of the keyboard may be advantageously used to accommodate more computer circuitry or, alternatively, to permit the reduction by a distance T of the vertical thickness of the computer base housing.

The foregoing detailed description is to be clearly understood as being given by way of illustration and example only, the spirit and scope of the present invention being limited solely by the appended claims.

What is claimed is:

1. Computer keyboard apparatus comprising:
    a key pad structure having top and bottom sides;
    a series of key cap members positioned above said top side of said key pad structure and mutually spaced apart from one another in a direction parallel to said top side, each of said key cap members having a bottom side edge periphery facing said top side of said key pad structure, and an upwardly dished interior portion bounded by said bottom side edge periphery;
    a spaced apart series of individual key support and guide members supported on said top side of said key pad structure in an aligned, underlying relationship with said series of key cap members, each of said key support and guide members having a base wall with a top side and further having a side edge periphery spaced inwardly of the bottom side edge periphery of its associated key cap member in a direction parallel to said top side of said key pad structure, said side edge peripheries of said individual key support and guide members being spaced apart along, circumscribed by, and extending downwardly to top side areas of said key pad structure positioned lower than said top sides of said base walls of said individual key support and guide members;
    linking means for securing each of said key cap members to its underlying key support and guide member for movement relative thereto, through a key stroke distance, between an upwardly extended position in which the key cap member is spaced upwardly apart from said top side of said key pad structure, and a downwardly retracted position in which the underlying key support and guide member is upwardly received in the interior of the key cap member with the bottom side edge periphery of the key cap member being adjacent its underlying top side area of said key pad structure and disposed lower than the top side of the base wall of the underlying key support and guide member; and
    biasing means for resiliently biasing each of said key cap members toward said upwardly extended position thereof.

2. The computer keyboard apparatus of claim 1 wherein:
    said key pad structure is a multilayer key pad structure having top and bottom layers, and
    said biasing means include a spaced series of resilient key return members aligned with and underlying said key cap members, and projecting upwardly from said top layer.

3. The computer keyboard apparatus of claim 2 wherein:

said key support and guide members have central openings therein, and said resilient key return members are elastomeric dome members projecting upwardly through said central openings.

4. The computer keyboard apparatus of claim 1 wherein:

said linking means include scissored linkage assemblies operatively interconnected between said key cap members and said key support and guide members.

5. The computer keyboard apparatus of claim 1 wherein:

said key support and guide members are supported on said key pad structure by cooperatively engaged locking means on said key support and guide members and said key pad structure.

6. Computer keyboard apparatus comprising:

a key pad structure having top and bottom sides;

a series of key cap members positioned above said top side said key pad structure and mutually spaced apart from one another in a direction parallel to said top side, each of said key cap members having a bottom side edge periphery facing said top side of said key pad structure, and an upwardly dished interior portion bounded by said bottom side edge periphery;

a spaced apart series of key support and guide members supported on said top side of said key pad structure in an aligned, underlying relationship with said series of key cap members, each of said key support and guide members having a top side and further having a side edge periphery spaced inwardly of the bottom side edge periphery of its associated key cap member in a direction parallel to said top side of said key pad structure;

linking means for securing each of said key cap members to its underlying key support and guide member for movement relative thereto, through a key stroke distance, between an upwardly extended position in which the key cap member is spaced upwardly apart from said top side of said key pad structure, and a downwardly retracted position in which the underlying key support and guide member is upwardly received in the interior of the key cap member with the bottom side edge periphery of the key cap member being adjacent said top side of said key pad structure; and biasing means for resiliently biasing each of said key cap members toward said upwardly extended position thereof, said key support and guide members being supported on said key pad structure by cooperatively engaged locking means on said key support and guide members and said key pad structure, said key pad structure being a multilayer structure having a top layer and a bottom layer, and a spaced series of holes extending downwardly through said top layer to said bottom layer, and said cooperatively engaged locking means including a spaced plurality of post members depending from said key support and guide members, extending downwardly through said holes, and being lockingly received in portions of said bottom layer.

7. The computer keyboard apparatus of claim 6 wherein:

said bottom layer is a metal base plate member having upturned flange portions, and said post members have enlarged lower end portions snap-fitted into pairs of said upturned flange portions.

8. Computer keyboard apparatus comprising:

a multilayer key pad structure having top and bottom layers;

a series of key cap members positioned above said top layer of said key pad structure and mutually spaced apart from one another in a direction parallel to said top layer, each of said key cap members having a bottom side edge periphery facing said top side of said key pad structure, and an upwardly dished interior portion bounded by said bottom side edge periphery;

a spaced apart series of individual key support and guide members supported on said top side of said key pad structure in an aligned, underlying relationship with said series of key cap members, each of said key support and guide members having a base wall with a top side, a side edge periphery spaced inwardly of the bottom side edge periphery of its associated key cap member in a direction parallel to said top layer of said key pad structure, and a central opening extending therethrough transversely to said top layer, said side edge peripheries of said individual key support and guide members being spaced apart along, circumscribed by, and extending downwardly to top side areas of said key pad structure positioned lower than said top sides of said base walls of said individual key support and guide members;

a series of scissored linkage assemblies securing each of said key cap members to its underlying key support and guide member for movement relative thereto, through a key stroke distance, between an upwardly extended position in which the key cap member is spaced upwardly apart from said top layer of said key pad structure, and a downwardly retracted position in which the underlying key support and guide member is upwardly received in the interior of the key cap member with the bottom side edge periphery of the key cap member being adjacent its underlying top side area of said key pad structure and positioned lower than the top side of the base wall of the underlying key support and guide member; and a spaced series of resilient key return members secured to said top layer of said key pad structure, extending upwardly through said central openings in said key support and guide members, and upwardly engaging said scissored linkage assemblies in a manner resiliently biasing said key cap members toward said upwardly extended positions thereof.

9. Computer keyboard apparatus comprising:

a multilayer key pad structure having top and bottom layers;

a series of key cap members positioned above said top layer of said key pad structure and mutually spaced apart from one another in a direction parallel to said top layer, each of said key cap members having a bottom side edge periphery facing said top side of said key pad structure, and an upwardly dished interior portion bounded by said bottom side edge periphery;

a spaced apart series of key support and guide members supported on said top side of said key pad structure in an aligned, underlying relationship with said series of key cap members, each of said key support and guide members having a top side, a side edge periphery spaced inwardly of the bottom side edge periphery of its associated key cap member in a direction parallel to said top layer of said key pad structure, and a central opening extending therethrough transversely to said top layer;

a series of scissored linkage assemblies securing each of said key cap members to its underlying key support and guide member for movement relative thereto, through a key stroke distance, between an upwardly extended position in which the key cap member is spaced upwardly apart from said top layer of said key pad structure, and a downwardly retracted position in which the underlying key support and guide member is upwardly received in the interior of the key cap member with the bottom side edge periphery of the key cap member being adjacent said top side of said key pad structure; and a spaced series of resilient key return members secured to said top layer of said key pad structure, extending upwardly through said central openings in said key support and guide members, and upwardly engaging said scissored linkage assemblies in a manner resiliently biasing said key cap members toward said upwardly extended positions thereof, said key pad structure having a spaced series of holes disposed therein and extending downwardly through said top layer to said bottom layer, and said key support and guide members being supported on said key pad structure by cooperatively engaged locking means on said key support and guide members and said key pad structure, said cooperatively engaged locking means including a spaced plurality of post members depending from said key support and guide members, extending downwardly through said holes, and being lockingly received in portions of said bottom layer.

10. The computer keyboard apparatus of claim 9 wherein:

said bottom layer is a metal base plate member having upturned flange portions, and said post members have enlarged lower end portions snap-fitted into pairs of said upturned flange portions.

11. A portable computer comprising:

a base housing having a top side;

a lid housing portion secured to said base housing portion for pivotal movement relative thereto between a closed position in which said lid housing portion extends across and covers said top side, and an open position in which said lid housing portion uncovers and exposes said top side; and reduced height keyboard apparatus disposed along said top side and including:

a key pad structure having top and bottom sides;

a series of key cap members positioned above said top side of said key pad structure and mutually spaced apart from one another in a direction parallel to said top side, each of said key cap members having a bottom side edge periphery facing said top side of said key pad structure, and an upwardly dished interior portion bounded by said bottom side edge periphery;

a spaced apart series of individual key support and guide members supported on said top side of said key pad structure in an aligned, underlying relationship with said series of key cap members, each of said key support and guide members having a base wall with a top side and further having a side edge periphery spaced inwardly of the bottom side edge periphery of its associated key cap member in a direction parallel to said top side of said key pad structure, said side edge peripheries of said individual key support and guide members being spaced apart along, circumscribed by, and extending downwardly to top side areas of said key pad structure positioned lower than said top sides of said base walls of said individual key support and guide members;

linking means for securing each of said key cap members to its underlying key support and guide member for movement relative thereto, through a key stroke distance, between an upwardly extended position in which the key cap member is spaced upwardly apart from said top side of said key pad structure, and a downwardly retracted position in which the underlying key support and guide member is upwardly received in the interior of the key cap member with the bottom side edge periphery of the key cap member being adjacent its underlying top side area of said key pad structure and disposed lower than the top side of the base wall of the underlying key support and guide member; and biasing means for resiliently biasing each of said key cap members toward said upwardly extended position thereof.

12. The portable computer of claim 11 wherein said portable computer is a notebook computer.

13. The portable computer of claim 11 wherein:

said key pad structure is a multilayer key pad structure having top and bottom layers, and said biasing means include a spaced series of resilient key return members aligned with and underlying said key cap members, and projecting upwardly from said top layer.

14. The portable computer of claim 13 wherein:

said key support and guide members have central openings therein, and said resilient key return members are elastomeric dome members projecting upwardly through said central openings.

15. The portable computer of claim 11 wherein:

said linking means include scissored linkage assemblies operatively interconnected between said key cap members and said key support and guide members.

16. The portable computer of claim 11 wherein:

said key support and guide members are supported on said key pad structure by cooperatively engaged locking means on said key support and guide members and said key pad structure.

17. A portable computer comprising:

a base housing having a top side;

a lid housing portion secured to said base housing portion for pivotal movement relative thereto between a closed position in which said lid housing portion extends across and covers said top side, and an open position in which said lid housing portion uncovers and exposes said top side; and reduced height keyboard apparatus disposed along said top side and including:

a key pad structure having top and bottom sides;

a series of key cap members positioned above said top side of said key pad structure and mutually spaced apart from one another in a direction parallel to said top side, each of said key cap members having a bottom side edge periphery facing said top side of said key pad structure, and an upwardly dished interior portion bounded by said bottom side edge periphery;

a spaced apart series of key support and guide members supported on said top side or said keypad structure in an aligned, underlying relationship with said series of key cap members, each of said key support and guide members having a top side and further having a side edge periphery spaced inwardly of the bottom side edge periphery of its associated keycap member in a direction parallel to said top side of said key pad structure;

linking means for securing each of said key cap members to its underlying key support and guide member for movement relative thereto, through a key stroke distance, between an upwardly extended position in which the key cap member is spaced upwardly apart from said top side of said key pad structure, and a downwardly retracted position in which the underlying key support and guide member is upwardly received in the interior of the key cap member with the bottom side edge periphery of the key cap member being adjacent said top side of said key pad structure; and biasing means for resiliently biasing each of said key cap members toward said upwardly extended position thereof, said key support and guide members being supported on said key pad structure by cooperatively engaged locking means on said key support and guide members and said key pad structure, said key pad structure being a multilayer structure having a top layer and a bottom layer, and a spaced series of holes extending downwardly through said top layer to said bottom layer, and said cooperatively engaged locking means including a spaced plurality of post members depending from said key support and guide members, extending downwardly through said holes, and being lockingly received in portions of said bottom layer.

18. The portable computer of claim 17 wherein:

said bottom layer is a metal base plate member having upturned flange portions, and said post members have enlarged lower end portions snap-fitted into pairs of said upturned flange portions.

* * * * *